United States Patent Office 3,086,440
Patented Apr. 23, 1963

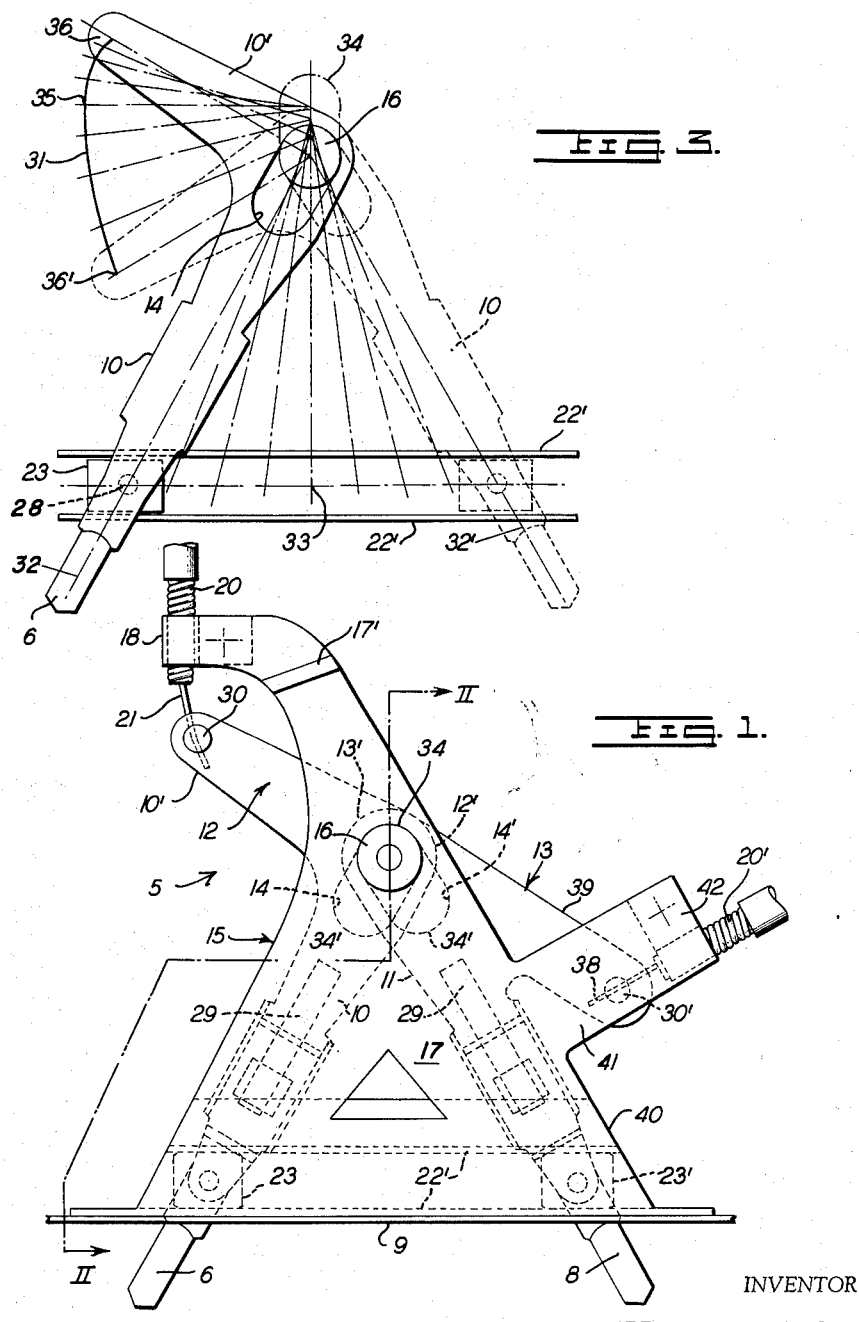

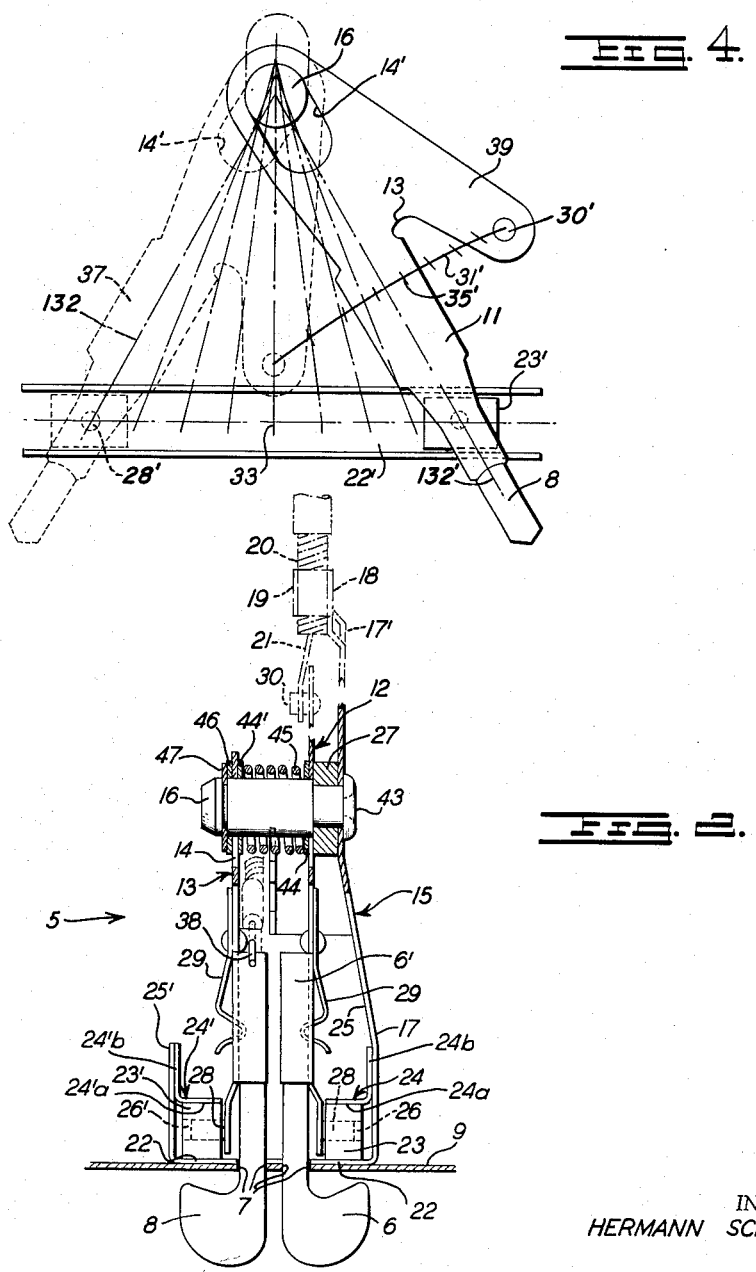

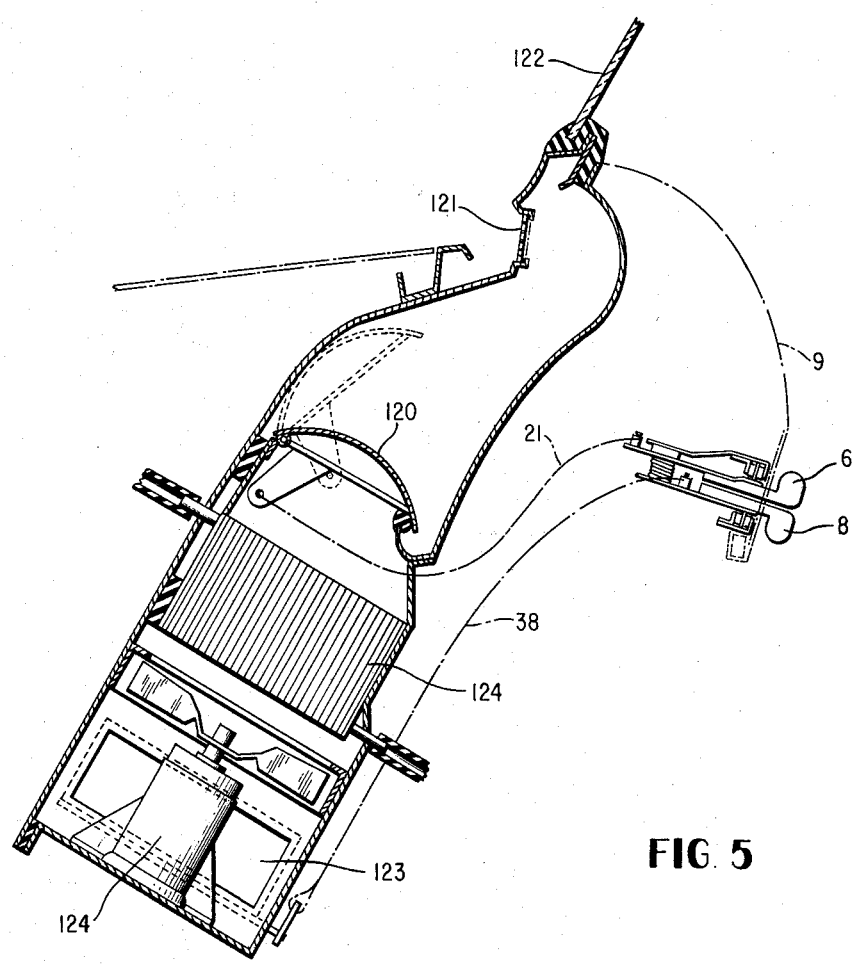

3,086,440
CONTROL ARRANGEMENT FOR A HEATING AND VENTILATING SYSTEM, ESPECIALLY OF MOTOR VEHICLES
Hermann Schmid, Maichingen, Kreis Boblingen, Germany, assignor to Daimler-Benz Aktiengesellschaft, Stuttgart-Untertuerkheim, Germany
Filed Apr. 6, 1959, Ser. No. 804,363
Claims priority, application Germany Apr. 12, 1958
14 Claims. (Cl. 98—2)

The present invention relates to a control arrangement for a heating and ventilating installation adapted to be adjusted by means of one or several adjustable control members, especially of motor vehicles, and essentially represents a simple structural solution to the problem of adapting the fresh air and heat requirements of the vehicle interior space to the prevailing driving conditions and also to the different local atmospheric conditions which may vary from place to place.

The adjusting installations known heretofore in the prior art which utilize a heating and/or ventilating control member installed in the air duct system of a motor vehicle and adapted to be adjusted or displaced by pivotal or swinging movements thereof, especially by the manual adjustment of a control lever arranged at the dashboard of the vehicle, entail the disadvantage that the particular quantity of inflowing air increases linearly in dependence on the particular position of the adjusting lever during movement thereof or is reduced correspondingly. With some prior art motor vehicles, the supply of the heated cooling water circulating through the engine is controlled or adjusted during the cold periods of the year by means of a second lever. With relatively colder temperatures, both adjusting levers are then displaced into the extreme or end positions thereof for purposes of achieving an acceptable or bearable temperature for the passengers of the vehicle, whereby the increased rate of fresh air flow is necessary in order to maintain the well being of the passengers. However, an excessive supply of warm air, especially into the upper part of the vehicle interior space, is very disagreeable, in particular during city-driving, while an unavoidable admission or supply of outside air containing noxious or injurious air particles such as exhaust gases, smoke or vapors, particularly to the upper vehicle interior space, oftentimes has very noticeably unpleasant and disagreeable effects on the passengers also during other periods or seasons of the year. This is also true in particular for those installations in which further adjusting levers are provided for selectively ventilating the upper and lower zones or regions of the vehicle interior space. Particularly in city traffic of such vehicles with cold temperatures or in cold weather, an additional supply of air, which almost always is contaminated and which is necessitated by the full occupancy of the vehicle into the upper vehicle space proves itself oftentimes unbearable by reason of the simultaneously supplied considerable heat.

Furthermore, the adjusting lever movement of prior art installations which usually takes place at the dashboard along an arcuate path to produce thereby the pivotal movement of a control member arranged in the air supply duct and controlling the air supply, constitutes an annoyance and/or danger factor since the adjusting lever handles protrude during adjusting movements thereof far beyond the actuating plane of the instrument panel and thereby extend into the vehicle interior space, whereby an inadvertent change in the adjusted position thereof and oftentimes also damage is caused when the clothes of a passenger carelessly get stuck or hung up thereon.

Furthermore, installations are known in which a non-linear air quantity control takes place as a result of the particular construction of the housing of the control member; however, the particular construction of such housings is complicated and thereby expensive and, in particular, a fine adjustment is not attainable with such installations under weather conditions which vary considerably.

The present invention obviates these prior art disadvantages and essentially consists in a heating and ventilating installation adapted to be adjusted by means of a control member, such as a flap, damper, control throttle valve member or the like, especially of motor vehicles, in which an adjusting mechanism controlling the position of the control member or members and including two adjusting levers having portions adapted to be displaced approximately horizontally and rectilinearly is provided for a progressive control-member opening or for a corresponding closing thereof which takes place in a direction opposite to the opening movement thereof. The adjustment of the desired ventilating and heating degree is effectuated in the control arrangement according to the present invention by means of the translatory displacement of two adjusting-lever handles whereby a larger quantity of fresh air is supplied to the upper zone of the vehicle interior space only after a considerable displacement of the zone-adjusting-lever handle provided therefor with an identical adjustment of both levers, whereas this supply of fresh air to the upper vehicle zone takes place over approximately the first half of the adjustment range of this zone-adjusting lever to a lesser extent. The second lever serves for purposes of controlling the selective ventilation of the upper or of the lower part of the vehicle interior space or selectively of the entire space whereas the supply of the heating medium to the heat exchanger takes place remote from both of the adjusting levers by means of a rotary knob or the like, the arrangement of which forms no part of the present invention and, therefore, may be of any suitable construction.

Accordingly, it is an object of the present invention to provide an adjusting arrangement for the control system of a heating and ventilating system, particularly for motor vehicles, which obviates the disadvantages of the prior art.

Still another object of the present invention resides in the adjusting and control arrangement for a heating and ventilating system, particularly of motor vehicles, which permits a selective adjustment of the amount of fresh air or outside air and of the region to which such air is supplied that assures maximum comfort to the passengers of the vehicle at all times.

Still another object of the present invention resides in the provision of an adjusting control arrangement for a heating and ventilating system, particularly of motor vehicles, which is simple in construction yet permits a non-linear control of the two control members for the heating and ventilating installations of the type mentioned above.

These and other objects, features and advantages of the present invention will become more obvious from the following description when taken in connection with the accompanying drawing, which shows, for purposes of illustration only, one embodiment in accordance with the present invention, and wherein:

FIGURE 1 is a top plan view of the adjusting arrangement in accordance with the present invention for the heating and ventilating installation of a motor vehicle;

FIGURE 2 is a cross-sectional view taken along line II—II of FIGURE 1;

FIGURE 3 is a schematic representation showing the respective positions assumed by one part or adjusting lever assembly of the adjusting installation of FIGURE 1 during the adjustment thereof from one end position to the other, whereby the full line position in FIGURE 3 corresponds to the closed position and the dot-and-dash line position to the fully opened position thereof;

FIGURE 4 is a schematic representation showing the respective positions assumed by the other part or adjusting lever assembly of the adjusting installation of FIGURE 1 during the adjustment thereof from one end position to the other, whereby again the full line position in FIGURE 4 corresponds to the fully closed position and dot-and-dash line position to the fully opened position thereof; and FIGURE 5 is a somewhat schematic partial vertical cross-sectional view showing the adjusting arrangement regulating a heating and ventilating installation of a motor vehicle.

Referring now to the drawing, wherein like reference numerals are used throughout the various views to designate like parts, reference numeral 5 generally designates in FIGURE 1 the adjusting mechanism for the control arrangement of a heating and ventilating installation of a motor vehicle. The adjusting mechanism 5 may be manually actuated by means of a first adjusting lever or adjusting-lever handle 6 adapted to be displaced within an adjusting slot 7 arranged at the dashboard 9 of the vehicle for purposes of controlling a control valve means operatively connected with the adjusting lever 6 and of any appropriate construction, such as a damper 120 (FIGURE 5) installed in or built into the air supply duct system of a motor vehicle wherein fresh air is received through a suitable opening such as an opening 121 in the body of the vehicle beneath the windshield 122 so as to selectively control or vary the amount of outside air flowing through the supply duct system. The control valve means might also be a throttle member, a flap, or the like. The selective distribution of the air supplied to the upper or to the lower region or zone of the vehicle interior space or simultaneously to both zones by means of a further appropriate control member such as a damper 123 adjacent a fan 124 again of any suitable construction and arranged within the heating and ventilating duct system of the installation behind a heat exchanger 125 is adjusted by means of a second movably arranged handle or adjusting lever 8 adapted to be displaced in a second slot 7 similar to and appropriately arranged directly below the first slot 7. The adjusting handle 8 is thereby adapted to be adjusted within the second slot 7 provided therefor at the dashboard 9 over the same adjusting range as the first lever or handle 6. Each handle or lever 6 and 8 is secured at the end of the relatively long leg portions 10 and 11 of two angle or bellcrank levers generally designated by reference numerals 12 and 13, respectively, which are pivotally supported with the elongated apertures 14 and 14', respectively, of similar size and arranged at the respective knee or angularly-bent portions 12' and 13' (FIGURE 1) on a pivot pin 16 extending essentially from the center of a substantially horizontally arranged support plate generally designated by reference numeral 15 so as to be pivotal approximately in a horizontal plane with one below the other (FIGURE 2).

The support plate 15 having an approximately triangularly shaped configuration as viewed from above is constructed of approximately L-shaped cross section as seen in FIGURE 2, the long leg portion 17 (FIGURES 1 and 2) of which pointing toward the apex of the triangle thereof is angularly bent (FIGURE 2) in an essentially S-shaped manner along the upper end portion 17' thereof which is bent or offset toward one side (FIGURE 2). The outer spiral cable armour 20 protectively surrounding an inner actuating wire or Bowden cable 21 is rotatably retained in proximity to the free end 18 (FIGURES 1 and 2) of this angularly bent portion by means of a clamp 19 (FIGURE 2). The end of wire 21 extending beyond the spiral cable armour 20 and secured near the free end of the relatively short leg portion 10' of angle lever 12 is pulled out or pushed in by the angle lever or bell crank 12 arranged on this side as a result of displacement of the handle 6 in slot 7. The wire 21 is thereby secured to the short leg portion 10' in any suitable manner, for example, by means of securing bolt or clamping member 30 (FIGURES 1 and 2). Two essentially rectangularly shaped sliding members 23 and 23' made of noiseless or low-noise material, such as, for example, of synthetic material, are inserted on mutually opposite sides of the approximately rectangularly shaped slots 7 into the short web portion 22 of the support plate 15 which is angularly bent back upon itself at the lower end thereof in the direction toward the free end 18 of the support plate 15 in the form of a guide channel or sliding path 22'. Each channel or sliding path 22' is thereby limited in the vertical dimension thereof as viewed in FIGURE 2, by means of a respective angle strip or angle iron generally designated by reference numerals 24 and 24' and secured in the forward lower part of the supporting plate 15. The angle strips or angle irons 24 and 24' are thereby provided with free leg portions 24a and 24'a directed towards each other, the other leg portions 24b and 24'b of which are secured in any suitable manner against the lower side 25 of the upwardly directed main part of the support plate 15 and against the end of the forwardly directed side 25' (FIGURE 2) respectively are angularly bent forwardly from the short web portion 22 of the support plate 15 toward the free end 18 thereof.

The two slide members 23 and 23' movably disposed along the free end of the support plate 15 near the dashboard 9 are provided with approximately vertically extending circular apertures or bores 26 and 26', respectively. The long leg portion 10 of the rotatably supported upper angle lever or bell crank 12 which is spaced from the lower side 25 of the plate member 17 forming part of the support plate 15 by a distance corresponding to or slightly larger than the thickness of a spacer disk 27 extends in the direction toward dashboard 9 behind the free leg portion 24a of the angle strip 24 approximately up to the slot 7. A pivot pin 28 extending from the long leg portion 10 of angle lever 12 near the free end thereof in proximity of slide path 22' in the direction toward the support plate part 17 and engaging in aperture 26 of slide 23 renders possible a rotary movement of the angle lever or bell crank 12 with respect to the sliding member 23 with each linear displacement of lever handle 6. Slide member 23' is provided with a similar pin member 28'. The lever handle 6 provided with a hook-shaped free end is inserted from the outside through the slot 7 into the dashboard 9 and is retained thereat by means of a detent spring 29 secured to the leg portion 10 of angle lever or bellcrank 12 and engaging in a corresponding recess provided therefor in the inserted portion 6' of the adjusting lever handle 6 (FIGURE 2).

The pivotability of the angle lever 12 is effected by the particular support thereof realized by means of the elongated aperture 14 through which extends the pivot pin 16 secured to the support plate 15. An operating wire or Bowden cable 21 is operatively connected in a conventional manner by means of bolt member 30 at the free end of the short leg portion 10' which extends at an approximately right angle from the long leg portion 10 thereof. A translatory displacement of the adjusting handle 6 from one end position thereof toward the other, for example, toward the right side as viewed in FIGURE 1, provides a sliding movement of the angle lever or bellcrank 12 with the elongated aperture 14 thereof along the stationary pivot pin 16 in the direction toward the free upper end 18 of the supporting plate 15, i.e., in the direction toward the apex of the triangle of support plate 15. Simultaneously therewith, however the angle lever or bellcrank 12 carries out a pivotal movement about the pivot pin 16 by reason of the presence of the guide means or guide channel 22' for the sliding member 23 formed intermediate the short lower web portion 22 of the securing plate 15 and the angle strip 24 and by reason of the pivotal engagement between pin 28 of long leg portion 10 in bore 26 of sliding member 23 so that the short angle-lever leg portion 10' is pivoted in the direction toward the guide channel 22', and, more particularly, the securing bolt member 30 for the operating wire or Bowden cable 21 describes a curve 31 which has the shape of a parabola (FIGURE 3).

From the corresponding step-by-step displacement movements of the various parts as illustrated in FIGURE 3, it becomes quite clear that the determination and arrangement of the mutual distances and the form as well as the support of the movable parts were made for the purpose to achieve a disproportionate movement of the control members such as the throttle valves, i.e., a movement of the control members which does not follow a straight-line relationship.

With a fully closed air control member in the air feed or supply duct, the adjusting handle 6 is positioned approximately at the end of the slot 7 in the dashboard 9 as shown in full lines in FIGURES 1 and 3; the end positions 32 and 32' of the adjusting handle 6 and therewith of leg portions 10 and 10' are thereby determined on each side of slot 7 by the abutment of the pivot pin 16 against that arcuate portion 34 of the elongated aperture 14 which is further away from the guide means 22'. In the center position 33 of angle lever 12 and of the adjusting lever 6 during displacement of the lever handle 6 along the adjusting path into a position intermediate the two end points 32 and 32' thereof, the pivot pin 16 rests against the arcuate portion 34' of the elongated aperture 14 closest to the sliding path 22' or guide means. The elongated aperture 14 is thereby directed approximately perpendicularly to the sliding path or guide means 22' in this center position. The other angle lever or bellcrank 13 operates in essentially the same manner as angle lever 12 and is thereby also limited in a similar manner by the abutment of arcuate portion 34 of elongated aperture 14' against pivot pin 16 in the two end positions 132 and 132' thereof. As a result of the particular construction used by the present invention, a further displacement of each adjusting lever 6 and 8 beyond the end points 32 and 32' or 132 and 132' thereof toward the outsides of slots 7 is not possible.

The slot 7 has approximately the length of the sliding path 22'. With a displacement of the lever handle 6 approximately by one-half the length of the slot 7, i.e., into the center position thereof at 33, the securing bolt member 30 at the relatively short leg portion 10' has traversed only a small part of the arcuate path 31, when reaching the corresponding position 35 along the adjusting curve 31 thereof, whereby the control valve member in the air supply line or duct is opened only by a slight amount. When the adjusting lever handle 6 passes beyond the center position 33 of the adjusting path thereof, the Bowden cable or operating wire 21 is moved or pulled over an arcuate path into another end position 36' thereof along the arcuate path 31 (FIG. 3) which corresponds to the end position 32' in guide means 22' and which is almost three times as large as the path from the initial end position 36 thereof to the center position 35 corresponding to the position 33 of the adjusting lever handle 6; the air control member thereby assumes a completely opened position with the short leg portion 10' at point 36' thereof. Consequently, the ventilating installation, in the second lateral end position 32' of the adjusting lever handle 6 of the adjusting installation 5, which lever 6 is adapted to be adjusted approximately horizontally supplies the largest amount of ventilating or heating air.

The adjustment of the selective ventilation for the upper or lower zone of the vehicle interior space is obtained by means of movement of the adjusting lever handle 8 the position of which is indicated in full lines in FIGURES 1 and 4 directly below the completely opened position 32' of the adjusting lever handle 6. In this position of lever 8, shown in full lines, which corresponds to the completely opened position of the air-supply control member, in the end position 32' thereof, the distributor control member 123 (FIGURE 5) which may be of any suitable construction, such as a control valve, a throttle member, a flap, a damper or the like, opens up completely the supply of fresh air into the upper zone of the vehicle interior space. With a longitudinal displacement of the lever handle 8, which is also arranged at the free end of a relatively long leg portion 11 of the angle lever or bellcrank 13 angularly bent at an acute angle and disposed at relatively slight distance below the horizontal displacement plane of the upper lever handle 6, from one end position 132' to the other end position 132 thereof the distributor control valve member 123 is pivoted from the fully opened position in which it opens up completely the upper zone while blocking or closing off the supply duct to the lower zone or region of the vehicle passenger space over a position in which there is an approximately even air distribution for both zones or regions after a gradual throttling of the supply for the upper zone into a position in which the upper zone is completely blocked or closed off while the line or duct to the lower zone is opened to the fullest extent thereof. The movement of the distributor control valve member is also carried out by the use of an operating wire or Bowden cable 38 operatively connected with the relatively short leg portion 39 of the knee lever 13. The free end of the inner wire 38 of the Bowden cable extending beyond a cable armour 20' is secured to the short leg portion 39 by means of a bolt member 30', while the armour 20' is secured at lug portion 41 extending approximately perpendicularly from the right outer side 40 of supporting plate 15 in close proximity to the second end point 132' of the sliding path 22' by means of a clamp 42 in the same manner as is the case for the Bowden cable 21, 20 at the upper end 18 of the supporting plate 15 and as illustrated in detail in FIGURES 1, 2 and 4. The two adjusting handles 6 and 8 are shown in FIGURE 1 in the two mutually opposite end positions thereof only for reasons of greater clarity. The levers 6 and 8 are adjusted in most cases to the center positions 33 thereof, i.e., so as to be disposed one above the other. If only a ventilation of the lower zone of the vehicle interior space is required, then the lever handle 8 must not leave the end position 132 thereof.

By reason of the acute angle of the angle lever or bellcrank 13, the pin 30' secured to leg portion 39 and therewith wire 38, as handle 8 moves from end position 132' thereof into center position 33, the entraining bolt member 30' moves along approximately two-fifths of the entire arcuate path 31' corresponding to the entire control valve movement into the corresponding position 35' of the entrainment bolt member 30' for wire 38. The center position 33 is the same for both lever handles 6 and 8 by reason of the same adjusting path from one end point 132 to the other end point 132'. If it is necessary to provide for one of the two zones a larger quantity of air supply than for the other, then a displacement of the lower adjusting lever handle 8 beyond the center point 33 toward one or the other end position 132 and 132' suffices.

The two angle levers 12 and 13 are provided each with identically shaped elongated apertures 14 and 14' respectively. Moreover, the manner of securing the handle levers 6 and 8 at mutually opposite sides of the angle levers 12 and 13 by means of leaf springs 29 as well as the insertion of the two sliding members 23 and 23' takes place for both angle levers 12 and 13 in the same manner. However, in all positions of lever handle 6 within slot 7 with the exception of its position at the end point 32 on one side thereof, a supply of fresh air into the vehicle interior is possible for each position of the adjusting lever handle 8 within slot 7, inclusive both end positions 132 and 132' thereof which depending on the position of handle 8 in slot 7 takes place selectively either to the upper or lower region or simultaneously into both zones of the vehicle interior space. The increase of the respective opening angle of the distributor control valve member takes place by reason of the pointed or acute shape of angle lever 13, so that when angle lever 13 assumes the center position 33 thereof in slot 7, not exactly the same quantity, namely only about two-fifths of the fresh air supplied by the air pressure caused during the drive of the vehicle and/or by means of the engagement of a blower may flow into the upper zone or region while about three-fifths will flow into the lower zone or region of the vehicle interior space.

The pivot pin member 16 for both angle levers 12 and 13 is secured at support plate 15 by means of an expansion rivet 43 (FIGURE 2) approximately above the center of the support plate 15. The spacer disk 27 serves to maintain the distance of the upper angle lever 12 from the supporting plate 15 necessitated by the sliding member 23. A washer or shim plate 44 is pressed by means of a spring 45 provided on the pin member 16 against the upper angle lever 12 while a further washer or shim disk 44' is pressed by spring 45 against the lower angle lever 13 in order to assure the distance of the two angle levers 12 and 13 from each other. A further washer or shim disk 46 prevents by means of a snap ring 47 placed over the free end of the pivot pin 16 an escape or deflection of the lower angle lever 13. The disks 44, 44' and 46 also prevent an unwinding and therewith a release of the tension of spacer spring 45 during a rotary movement of the angle lever 12 and 13.

Of course, depending in particular on the arrangement and mode of operation of the distributor control valve member, both zones of the vehicle interior space may be ventilated by a corresponding displacement of the adjusting lever handle 8 also from the one end position 132 thereof simultaneously to an increasing extent, however, with either different or similar partial amounts corresponding to the quantity of supplied air which flows into the ventilating system of the vehicle interior space, depending on the displacement of the upper adjusting lever handle 6. The supporting plate 15 may be provided with a rounded-off triangularly shaped aperture in the center of the triangularly shaped leg portion 17 for purposes of decreasing the weight, whereby the plate 15 assumes an essentially λ-shaped configuration as seen from above.

While I have shown and described one embodiment in accordance with the present invention, it is understood that the same is not limited thereto but is susceptible of many changes and modifications within the spirit and scope of the present invention and I, therefore, do not wish to be limited to the details shown and described herein, but intend to cover all such changes and modifications as are encompassed by the scope of the appended claims.

I claim:

1. A control installation for an adjustable heating and ventilating installation by means of control valve means, especially for motor vehicles, comprising two approximately horizontally displaceable adjusting levers, a relatively stationary vehicle part provided with elongated slot means, support means, said adjusting levers being pivotally secured to said support means and adapted to be displaced in said slot means to define operating ranges, guide means formed at least in part by said support means for essentially rectilinearly guiding the movement of one end of each of said levers, common pivot means for said levers adjacent the other ends of said levers enabling said levers to be pivotally displaced in said slot means, connecting means operatively connecting said other end of each lever with a respective valve means, and lost motion means associated with each lever and including said common pivot means and operative with said guide means to enable a given incremental movement of a respective one of said levers to produce a first amount of change in position of a respective control valve means in one portion of its operating range and to enable the same incremental movement of said one lever to produce a different amount of change in position of the respective control valve means in another portion of its operating range.

2. A control installation for an adjustable heating and ventilating installation according to claim 1, wherein said levers are bell-crank levers having two leg portions disposed angularly with respect to each other, and wherein said common pivot means is disposed near the angularly bent portion of said bell-crank levers.

3. A control installation for an adjustable heating and ventilating installation according to claim 2, wherein each of said bell-crank levers is provided with an elongated aperture through which said common pivot means extends and disposed in proximity of the respective angularly bent portion.

4. A control installation for an adjustable heating and ventilating installation according to claim 3, wherein each elongated aperture is provided with an arcuate end portion at both ends thereof which corresponds essentially in its configuration to the circumference of said common pivot means.

5. A control installation for an adjustable heating and ventilating installation according to claim 1, wherein said support means is an essentially triangularly shaped support plate of essentially L-shaped cross section and provided with an end portion bent back upon itself and a web portion connecting said end portion with the main part of said support plate, said common pivot means being disposed approximately in the center of said triangularly shaped support plate.

6. A control installation for an adjustable heating and ventilating installation according to claim 5, wherein said support plate is provided with a cut-out portion so as to be essentially λ-shaped as viewed from above.

7. A control installation for an adjustable heating and ventilating installation in a motor vehicle provided with air flow control members for selectively varying the amount of air flowing into the vehicle, comprising two adjusting levers displaceable in parallel planes and provided with lost motion means including fulcrum means, a relatively stationary vehicle part provided with elongated slots, each adjusting lever having a handle means secured thereof, each adjusting lever having portions displaceable in said slots, each handle means having a slidable means connected thereto and to a respective adjusting lever, stationary rectilinear guide means engaging each slidable means to afford rectilinear movement therein of each slidable means, and connecting means operatively connecting each of said adjusting levers with a respective control member.

8. A control installation for an adjustable heating and ventilating installation according to claim 7, wherein said guide means and said connecting means are operative to provide a positioning of said control members which is disproportional to the adjusting movement of the respective angle levers.

9. A control installation for an adjustable heating and ventilating installation according to claim 7, wherein said relatively stationary vehicle part is a dashboard and wherein said slots are rectangularly shaped slots disposed in said dashboard.

10. A control installation for an adjustable heating and ventilating installation according to claim 7, wherein said slidable means includes two slide members, guide member made of noise-absorbing material slidingly guided within said guide means and each provided with an aperture and wherein each adjusting lever is provided with a pin engaging in a corresponding aperture of said slide members.

11. A control installation for an adjustable heating and ventilating installation according to claim 7, further comprising rivet means for securing said common pivot means at said support means, and spring means for retaining said levers on said common pivot means so as to be adjustable with respect to each other while retaining a predetermined distance.

12. A control installation for an adjustable heating and ventilating installation according to claim 7, wherein said adjusting levers are bell cranks having each a relatively long leg portion and a relatively short leg portion, and wherein the relatively short leg portion extends at an approximately right angle with respect to the relatively long leg portion of the said bell crank and a relatively short leg portion of the other bell crank subtends an acute angle with the long leg portion thereof.

13. A control installation for an adjustable heating and ventilating installation according to claim 7, wherein said support means is a support plate having the exposed end thereof bent back upon itself to provide a free end portion and a web portion connecting said free end portion with the main portion of said support plate, and wherein said guide means are formed by the inner side of said web portion, by the underside of said main portion and by the upper side of said free end, and substantially right angle strip means delimiting said guide means with one leg portion of one of said angle strip means secured to said free end portion and one leg portion of another angle strip means secured to said underside of said main portion and with the free leg portions of each angle strip means extending in the direction toward one another.

14. A control installation for an adjustable heating and ventilating installation according to claim 13, wherein said slidable means includes a sliding member secured to each lever and provided with an aperture, and a pin member extending from a respective one of said levers into a corresponding aperture of the respective sliding member.

References Cited in the file of this patent

UNITED STATES PATENTS

| | | |
|---|---|---|
| 2,453,560 | Westberg et al. | Nov. 9, 1948 |
| 2,682,178 | Powell | June 29, 1954 |
| 2,707,079 | Little et al. | Apr. 26, 1955 |
| 2,716,902 | Skareen | Sept. 6, 1955 |
| 2,800,285 | Muller et al. | July 23, 1957 |
| 2,963,954 | Baker | Dec. 13, 1960 |